US012675302B2

(12) United States Patent
Wu

(10) Patent No.: US 12,675,302 B2
(45) Date of Patent: Jul. 7, 2026

(54) APPLICATION MANAGEMENT METHOD AND APPARATUS, AND ELECTRONIC DEVICE

(71) Applicant: VIVO MOBILE COMMUNICATION CO., LTD., Dongguan (CN)

(72) Inventor: Yimao Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 8 days.

(21) Appl. No.: 18/610,256

(22) Filed: Mar. 19, 2024

(65) Prior Publication Data

US 2024/0220289 A1 Jul. 4, 2024

Related U.S. Application Data

(63) Continuation of application No. 18/090,456, filed on Dec. 28, 2022, now Pat. No. 11,972,274, which is a
(Continued)

(30) Foreign Application Priority Data

Jun. 29, 2020 (CN) .......................... 202010610294.5

(51) Int. Cl.
*G06F 3/0484* (2022.01)
*G06F 3/04817* (2022.01)
(Continued)

(52) U.S. Cl.
CPC .......... *G06F 9/451* (2018.02); *G06F 3/04817* (2013.01); *G06F 3/0482* (2013.01); *G06F 3/0484* (2013.01); *G06F 8/65* (2013.01)

(58) Field of Classification Search
CPC .... G06F 9/451; G06F 3/04817; G06F 3/0482; G06F 3/0484; G06F 8/65;
(Continued)

(56) References Cited

U.S. PATENT DOCUMENTS

| | | | | |
|---|---|---|---|---|
| 7,636,898 B2 * | 12/2009 | Takahashi | ............. | G06F 3/0486 |
| | | | | 715/769 |
| 8,245,143 B2 | 8/2012 | Yach | | |

(Continued)

FOREIGN PATENT DOCUMENTS

| | | |
|---|---|---|
| CN | 102348030 A | 2/2012 |
| CN | 102375752 A | 3/2012 |

(Continued)

OTHER PUBLICATIONS

Roman Loyola, How to rearrange app icons on your iPhone, Dec. 26, 2018, retrieved from—https://www.macworld.com/article/226155/how-to-rearrange-app-icons-on-your-iphone.html, 3 pages (Year: 2018).*

(Continued)

*Primary Examiner* — Yongjia Pan
(74) *Attorney, Agent, or Firm* — IPX PLLC

(57) ABSTRACT

An application management method and apparatus, and an electronic device are provided. The method includes: recognizing that a target image satisfies a preset condition, where the preset condition includes an action of a user to trigger installing a non-installed application, updating an installed application, or creating a folder indicated by the target image; displaying at least one virtual icon indicating the action of the user; and performing a target operation in response to a first user input to the at least one virtual icon. The target operation includes at least one of the following: downloading the non-installed application corresponding to the at least one virtual icon, updating the installed application corresponding to the at least one virtual icon, or creating the folder corresponding to the at least one virtual icon.

10 Claims, 11 Drawing Sheets

The application management apparatus displays M icons in a first display mode in a case of recognizing that a target image satisfies a preset condition ⟩ 201

The application management apparatus receives a first input from a user to a target icon in the M icons ⟩ 202

The application management apparatus performs a target operation in response to the first input ⟩ 203

Related U.S. Application Data continuation of application No. PCT/CN2021/102549, filed on Jun. 25, 2021.

(51) Int. Cl.

| | | |
|---|---|---|
| *G06F 3/0482* | (2013.01) | |
| *G06F 9/451* | (2018.01) | |
| *G06F 8/65* | (2018.01) | |

(58) Field of Classification Search

CPC ......... G06F 2203/04804; G06F 3/0486; G06F 3/04883; G06F 8/61; G06F 3/04847; G06F 16/16

See application file for complete search history.

(56) References Cited

U.S. PATENT DOCUMENTS

| | | | | |
|---|---|---|---|---|
| 8,826,164 | B2 | 9/2014 | Cieplinski | |
| 9,294,606 | B2 | 3/2016 | Zhou | |
| 9,430,120 | B2 | 8/2016 | Cranfill et al. | |
| 9,535,600 | B2 * | 1/2017 | Lee | G06F 3/04883 |
| 9,772,749 | B2 | 9/2017 | Chaudhri | |
| 9,904,686 | B2 * | 2/2018 | Zhou | G06F 3/0486 |
| 2008/0250043 | A1 * | 10/2008 | Sato | G11B 27/34 |
| | | | | 707/E17.031 |
| 2011/0179097 | A1 * | 7/2011 | Ala-Rantala | G06F 3/0486 |
| | | | | 707/829 |
| 2011/0246918 | A1 * | 10/2011 | Henderson | G06F 3/0488 |
| | | | | 715/810 |
| 2011/0252373 | A1 * | 10/2011 | Chaudhri | H04N 7/147 |
| | | | | 715/835 |
| 2012/0030628 | A1 * | 2/2012 | Lee | G06F 3/04817 |
| | | | | 715/835 |
| 2012/0036218 | A1 | 2/2012 | Oh et al. | |
| 2012/0092346 | A1 * | 4/2012 | Ording | G06F 3/04842 |
| | | | | 345/473 |
| 2012/0309433 | A1 | 12/2012 | Jeong et al. | |
| 2012/0331457 | A1 | 12/2012 | Ryu et al. | |
| 2013/0055142 | A1 * | 2/2013 | Li | G06F 3/0488 |
| | | | | 715/777 |
| 2013/0120464 | A1 | 5/2013 | Wei | |
| 2013/0139109 | A1 | 5/2013 | Kim et al. | |
| 2013/0174069 | A1 | 7/2013 | Lee | |
| 2013/0187866 | A1 | 7/2013 | Kim et al. | |
| 2013/0205217 | A1 * | 8/2013 | Schuller | G06Q 30/0603 |
| | | | | 715/739 |
| 2014/0101616 | A1 * | 4/2014 | Kim | G06F 3/0482 |
| | | | | 715/846 |
| 2014/0123131 | A1 * | 5/2014 | Yamamoto | G06F 8/60 |
| | | | | 717/178 |
| 2014/0196026 | A1 | 7/2014 | Seo et al. | |
| 2014/0258936 | A1 | 9/2014 | Lee | |
| 2014/0282234 | A1 | 9/2014 | Ku et al. | |
| 2014/0317544 | A1 * | 10/2014 | Wang | G06F 3/0486 |
| | | | | 715/810 |
| 2015/0037870 | A1 | 2/2015 | Baker et al. | |
| 2015/0169183 | A1 | 6/2015 | Son et al. | |
| 2015/0296072 | A1 * | 10/2015 | Zhou | H04W 4/50 |
| | | | | 455/414.1 |
| 2016/0188179 | A1 | 6/2016 | Roh | |
| 2017/0109011 | A1 | 4/2017 | Jiang | |
| 2018/0260453 | A1 | 9/2018 | Lim | |
| 2018/0321825 | A1 | 11/2018 | Martineli | |
| 2019/0121628 | A1 * | 4/2019 | Hu | H04L 67/306 |
| 2020/0110529 | A1 | 4/2020 | Gao | |
| 2020/0117321 | A1 | 4/2020 | Phillips | |
| 2020/0310771 | A1 * | 10/2020 | Lu | G06F 3/0482 |

FOREIGN PATENT DOCUMENTS

| | | | | | |
|---|---|---|---|---|---|
| CN | 102946599 | A | | 2/2013 | |
| CN | 104750517 | A | | 7/2015 | |
| CN | 104951180 | A | | 9/2015 | |
| CN | 104951184 | A | * | 9/2015 | |
| CN | 106020899 | A | * | 10/2016 | ........ G06F 3/04817 |
| CN | 106155748 | A | | 11/2016 | |
| CN | 107436937 | A | | 12/2017 | |
| CN | 107958056 | A | | 4/2018 | |
| CN | 108234774 | A | | 6/2018 | |
| CN | 108255375 | A | | 7/2018 | |
| CN | 108595201 | A | | 9/2018 | |
| CN | 108804183 | A | | 11/2018 | |
| CN | 108958586 | A | * | 12/2018 | ........ G06F 3/04817 |
| CN | 109189282 | A | | 1/2019 | |
| CN | 109656649 | A | | 4/2019 | |
| CN | 110968280 | A | | 4/2020 | |
| CN | 106293696 | A | | 5/2020 | |
| CN | 111913616 | A | | 11/2020 | |
| JP | 2017004552 | A | * | 1/2017 | .............. G06F 8/61 |
| JP | 2017041198 | A | | 2/2017 | |
| JP | 2017123184 | A | | 7/2017 | |
| TW | 201903594 | A | | 1/2019 | |
| WO | WO-2014071755 | A1 | * | 5/2014 | .............. G06F 8/61 |
| WO | WO-2018188289 | A1 | * | 10/2018 | ........... G06F 11/324 |
| WO | 2019149028 | A1 | | 8/2019 | |

OTHER PUBLICATIONS

International Search Report issued in corresponding International Application No. PCT/CN2021/102549, mailed Sep. 15, 2021, 5 pages.

First Office Action issued in related Chinese Application No. 202010610294.5, mailed Jul. 27, 2021, 11 pages.

Second Office Action issued in related Chinese Application No. 202010610294.5, mailed Apr. 19, 2022, 8 pages.

Roman Loyola, How to rearrange app icons on your iPhone, retrieved from—https://www.macworld.com/article/226155/ how-to-rearrange-app-icons-on-your-iphone.html, Dec. 26, 2018, 3 pages(Year: 2018).

Extended European Search Report issued in related European Application No. 21832876.3, mailed Oct. 24, 2023, 9 pages.

First Office Action issued in related European Application No. 21832876.3, mailed Mar. 19, 2026, 7 pages.

Review Decision issued in related Chinese Application No. 202010610294.5, mailed Mar. 19, 2026, 26 pages.

* cited by examiner

| | |
|---|---|
| The application management apparatus displays M icons in a first display mode in a case of recognizing that a target image satisfies a preset condition | 201 |
| The application management apparatus receives a first input from a user to a target icon in the M icons | 202 |
| The application management apparatus performs a target operation in response to the first input | 203 |

APPLICATION MANAGEMENT METHOD AND APPARATUS, AND ELECTRONIC DEVICE

CROSS-REFERENCE TO RELATED APPLICATIONS

This application is a continuation of U.S. application Ser. No. 18/090,456, filed Dec. 28, 2022, now U.S. Pat. No. 11,972,274, which is a continuation of International Application No. PCT/CN2021/102549, filed Jun. 25, 2021, which claims priority to Chinese Patent Application No. 202010610294.5, filed Jun. 29, 2020. The entire contents of each of the above-referenced applications are expressly incorporated herein by reference.

TECHNICAL FIELD

Embodiments of this application relate to the field of communications technologies, and in particular, to an application management method and apparatus, and an electronic device.

BACKGROUND

With the development of communications technologies, the variety and number of applications that can be installed in the electronic device is increasing, and users are also demanding more in the convenience of managing (for example, downloading and installing, updating, and organizing) the applications.

Now, take a user triggering the electronic device to install an application as an example. First, the user needs to determine a desired application; then the user may trigger the electronic device to enable the "App Store"; next, the user may enter the name of the application in the search box displayed on the interface of the "App Store"; and finally, the user may trigger the electronic device to download and install the searched application.

However, when the user cannot determine the desired application, for example, the user does not know the name of the application, many other applications may be searched for. In this case, the user may need to download and install each searched application to determine the desired application, which results in cumbersome operations and low efficiency in the process of managing applications.

SUMMARY

Embodiments of this application aim to provide an application management method and apparatus, and an electronic device.

According to a first aspect, embodiments of this application provide an application management method, where the method includes: in a case of recognizing that a target image satisfies a preset condition, displaying M icons in a first display manner, where M is a positive integer; receiving a first input from a user to a target icon in the M icons; and performing a target operation in response to the first input, where each icon displayed in the first display manner indicates any one of the following: a non-installed application, an application to be updated, or an uncreated folder; and the target operation includes at least one of the following: downloading an application corresponding to the target icon, updating the application corresponding to the target icon, or creating a new target folder corresponding to the target icon.

According to a second aspect, embodiments of this application provide an application management apparatus, where the apparatus includes: a display module, a receiving module, and an execution module, where the display module is configured to: in a case of recognizing that a target image satisfies a preset condition, display M icons in a first display manner, where M is a positive integer; the receiving module is configured to receive a first input from a user to a target icon in the M icons displayed by the display module; and the execution module is configured to perform a target operation in response to the first input received by the receiving module, where each icon displayed in the first display manner indicates any one of the following: a non-installed application, an application to be updated, or an uncreated folder; and the target operation includes at least one of the following: downloading an application corresponding to the target icon, updating the application corresponding to the target icon, or creating a new target folder corresponding to the target icon.

According to a third aspect, an embodiment of this application provides an electronic device, where the electronic device includes a processor, a memory, and a program or an instruction stored in the memory and executable on the processor, and when the program or the instruction is executed by the processor, steps of the method according to the first aspect are implemented.

According to a fourth aspect, an embodiment of this application provides a readable storage medium, where the readable storage medium stores a program or an instruction, and when the program or the instruction is executed by a processor, steps of the method according to the first aspect are implemented.

According to a fifth aspect, an embodiment of this application provides a chip, where the chip includes a processor and a communications interface, the communications interface is coupled to the processor, and the processor is configured to run a program or an instruction to implement the method according to the first aspect.

In the embodiments of this application, the application management apparatus may display the M icons in a first display manner in a case of recognizing that a target image satisfies a preset condition, where each icon displayed in the first display manner indicates any one of the following: a non-installed application, an application to be updated, or an uncreated folder. Then, after receiving the first input from the user to the target icon in the M icons, the application management apparatus may perform the target operation. The target operation includes at least one of the following: downloading an application corresponding to the target icon, updating the application corresponding to the target icon, or creating a new target folder corresponding to the target icon.

DETAILED DESCRIPTION

Figure 1:
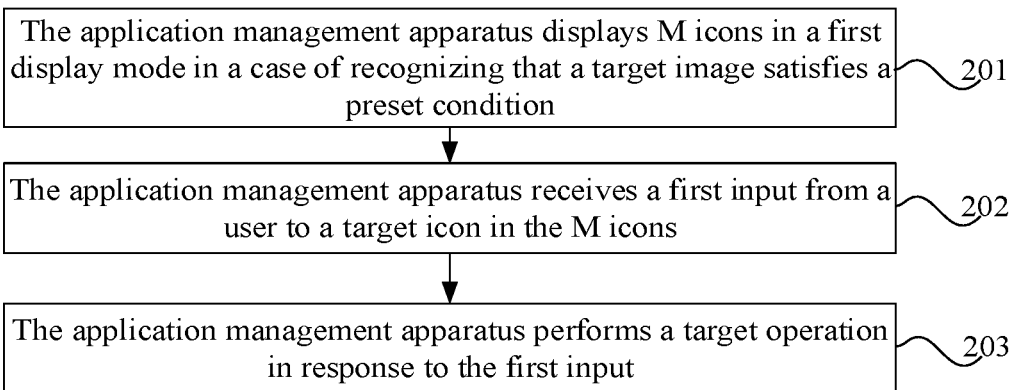
FIG. 1 is a schematic flowchart of an application management method according to an embodiment of this application.

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in this way is interchangeable in appropriate circumstances so that the embodiments of this application described can be implemented in other orders than the order illustrated or described herein. Objects distinguished by "first", "second", and the like usually belong to one type, and the number of the objects is not limited. For example, there may be one or more first objects. In addition, in the specification and claims, "and/or" is used to indicate at least one of the connected objects, and the character "/" usually indicates that associated objects are in an "or" relationship.

The electronic device may recognize the image, display a virtual icon of the corresponding application in the image, and show the user a non-installed application, an application to be updated, or an uncreated folder.

Scenario 1: The user replaces a new mobile phone and wants to trigger the electronic device to install the application, or the user wants to trigger the electronic device to install the application on the poster, or the user wants to help other users trigger the electronic device to install the application, and the like. The user may trigger the electronic device to recognize a desired image, and the image includes an image of the application that the user wants to install. Then, in a case that the electronic device recognizes the application in the target image, a virtual icon may be displayed, and the virtual icon indicates the application that the user wants to install. Finally, the user may enter the virtual icon to trigger the electronic device to download and install the application, which simplifies the steps of installing the application.

Scenario 2: If the user wants to trigger the electronic device to update the installed application in the electronic device, the user may trigger the electronic device to recognize the desired image, and the image includes an image of the application that the user wants to update. Then, in a case that the electronic device recognizes the application in the target image, a virtual icon may be displayed, and the virtual icon indicates the application that the user wants to update. Finally, the user may enter the virtual icon to trigger the electronic device to update the application, which simplifies the steps of updating the application.

Scenario 3: If the user wants to trigger the electronic device to create a folder, the user may trigger the electronic device to recognize the desired image, and the image includes an image of the folder that the user wants to create. Then, in a case that the electronic device recognizes the application in the target image, a virtual icon may be displayed, and the virtual icon indicates the folder that the user wants to create. Finally, the user may enter the virtual icon to trigger the electronic device to create the folder, which simplifies the steps of creating the folder.

With reference to the accompanying drawings, an application management method provided in the embodiments of this application is described in detail by using specific embodiments and application scenarios.

FIG. 1 is a schematic flowchart of an application management method according to an embodiment of this application, including step 201 to step 203.

Step 201: The application management apparatus displays M icons in a first display manner in a case of recognizing that a target image satisfies a preset condition.

Each icon displayed in the first display manner indicates any one of the following: a non-installed application, an application to be updated, or an uncreated folder, where M is a positive integer.

In this embodiment of this application, the foregoing target image may be an image collected by a camera of the application management apparatus, an image downloaded by the application management apparatus, an image saved in the application management apparatus system, or an image received by the application management apparatus, which is not limited in this embodiment of this application.

In this embodiment of this application, that the application management apparatus recognizes that a target image satisfies a preset condition includes at least one of the following: the application management apparatus recognizes that the target image includes identifiers of N applications, and the N applications are non-installed applications or applications to be updated in an electronic device; or the application management apparatus recognizes that the target image includes identifiers of X folders, and the X folders are uncreated folders in the electronic device. Both N and X are positive integers.

The foregoing identifier may include at least one of the following: a word or an image. For example, the identifier may be an image corresponding to the icon of the application in the target image, or an image corresponding to the icon of the folder in the target image.

The electronic device in this embodiment of this application may be an application management apparatus, or a device including the application management apparatus. This is not limited in this embodiment of this application.

It can be understood that the target image may be corresponding to N applications, corresponding to X folders, or corresponding to N applications and X folders. This is not limited in this embodiment of this application.

In this embodiment of this application, N may be greater than M, less than M, or equal to M. This is not limited in this embodiment of this application.

For example, in a case that all the M icons indicate the non-installed applications, and N is greater than M, in Example 1, if the application management apparatus recognizes N applications in the target image, due to the limited screen size of the application management apparatus, it is impossible to display all the icons corresponding to N applications at one time, then the application management apparatus may first display M icons in the first display manner, where the M icons are some of all icons corresponding to the N applications. When the user needs to view other icons corresponding to the N applications other than the M icons, the user may perform sliding input on the screen to trigger the application management apparatus to display other icons in the first display manner. In Example 2, in a case that the application management apparatus recognizes N applications in the target image, the user may trigger the application management apparatus to cancel recognizing some applications, and finally the application management apparatus may display the M icons in the first display manner, where the M icons are corresponding to recognized applications in the N applications.

In this embodiment of this application, step 201 described above may include the following step: in a case that the application management apparatus recognizes that the target image satisfies the preset condition and determines that the electronic device satisfies a first condition, display the M icons in the first display manner.

The first condition includes at least one of the following: there are Y installed applications to be updated, or there are P recommended non-installed applications.

For example, in addition to some or all of the icons corresponding to the N applications corresponding to the target image, or some or all of the icons corresponding to the X folders corresponding to the target image, the M icons may include some or all of the icons corresponding to P non-installed applications recommended by the application management apparatus, or some or all of the icons corresponding to Y installed applications to be updated that are not identified in the target image. The Y installed applications are: applications installed in the electronic device without corresponding identifiers in the target image.

For example, in a case that all the M icons indicate the non-installed applications, and N is less than M, if the application management apparatus recognizes the N applications in the target image, and the application management apparatus determines that there are Y installed applications to be updated, the application management apparatus displays icons corresponding to the N applications and icons corresponding to the Y installed applications (namely, the M icons described above) in the first display manner.

In this embodiment of this application, X may be greater than M, less than M, or equal to M. This is not limited in this embodiment of this application.

It should be noted that for the case that X is greater than M, reference may be made to the description of N greater than M in this embodiment of this application, and for the case that X is less than M, reference may be made to the description of N less than M in this embodiment of this application. Details are not described herein again.

In this embodiment of this application, the first display manner may include a first transparency. For example, if the first transparency is recorded as T1, a value range of T1 may be 0%<T1<100%.

It should be noted that, in addition to the first transparency, the first display manner may also include highlighting, flickering, and the like. This is not limited in this embodiment of this application.

In this embodiment of this application, the M icons in this application may include at least one of the following: an icon of an application, or an icon of a folder. This is not limited in this embodiment of this application.

For example, the icon of an application may be an application icon of an application, a shortcut icon of an application, or any icon that can indicate the application. This is not limited in this embodiment of this application.

For example, the icon of a folder may be a folder icon of a folder, a shortcut icon of a folder, or any icon that can indicate the folder. This is not limited in this embodiment of this application.

For example, the icon in this application may include at least one of the following: a word or an image.

For example, the icon formats of the foregoing M icons may be the same or different, which is not limited in this embodiment of this application. For example, the M icons may be in an icon format.

It should be noted that, the M icons displayed in the first display manner can be understood as: the application management apparatus displays M virtual icons. The virtual icon refers to an icon of an application that is not installed in the electronic device, or an icon of an application to be updated in the electronic device, or an icon of a folder that is not created in the electronic device.

In an example, the application management apparatus may display M icons in a target interface in the first display manner. The target interface may be an existing interface (for example, a desktop of the application management apparatus), a newly created interface, or a display interface for the target image. This is not limited in this embodiment of this application.

For example, if the application management apparatus is a mobile phone, after the user replaces the mobile phone and wants to install an application of the old mobile phone on the new mobile phone, the user may use the camera of the mobile phone to capture an image of a desktop of the old mobile phone.

Figure 2:
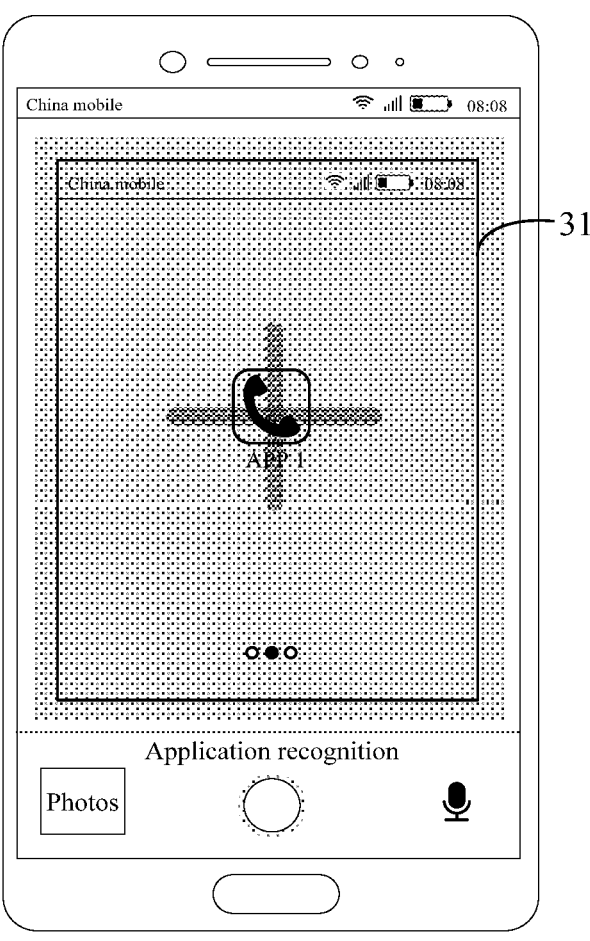
FIG. 2 is a first schematic diagram of an interface of an application management method according to an embodiment of this application.
Figure 3:
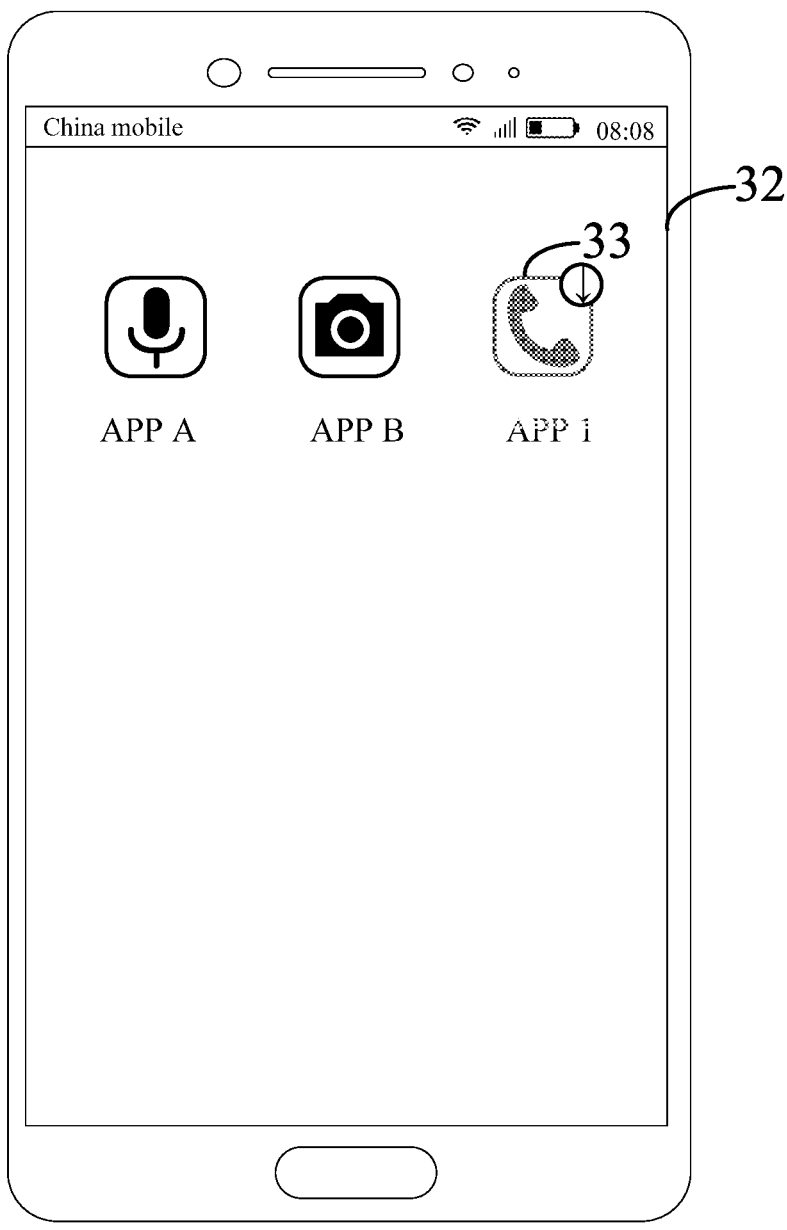
FIG. 3 is a second schematic diagram of an interface of an application management method according to an embodiment of this application.

Example 3, as shown in FIG. 2, a preview interface of the camera of the mobile phone is displayed on the screen of the mobile phone, and an image 31 of the desktop of the old mobile phone is displayed in the preview interface. The image 31 includes an image of one non-installed application, that is, an image of an application 1. Then, in a case that the mobile phone recognizes the application 1 in the image 31, as shown in FIG. 3, the mobile phone displays a mobile phone desktop 32. The desktop 32 displays icons of two original applications in a display manner with a transparency of 100%, namely, an icon of an application A and an icon of an application B, and also displays an icon 33 of the application 1 in a display manner with a transparency of 50%.

Figure 4:
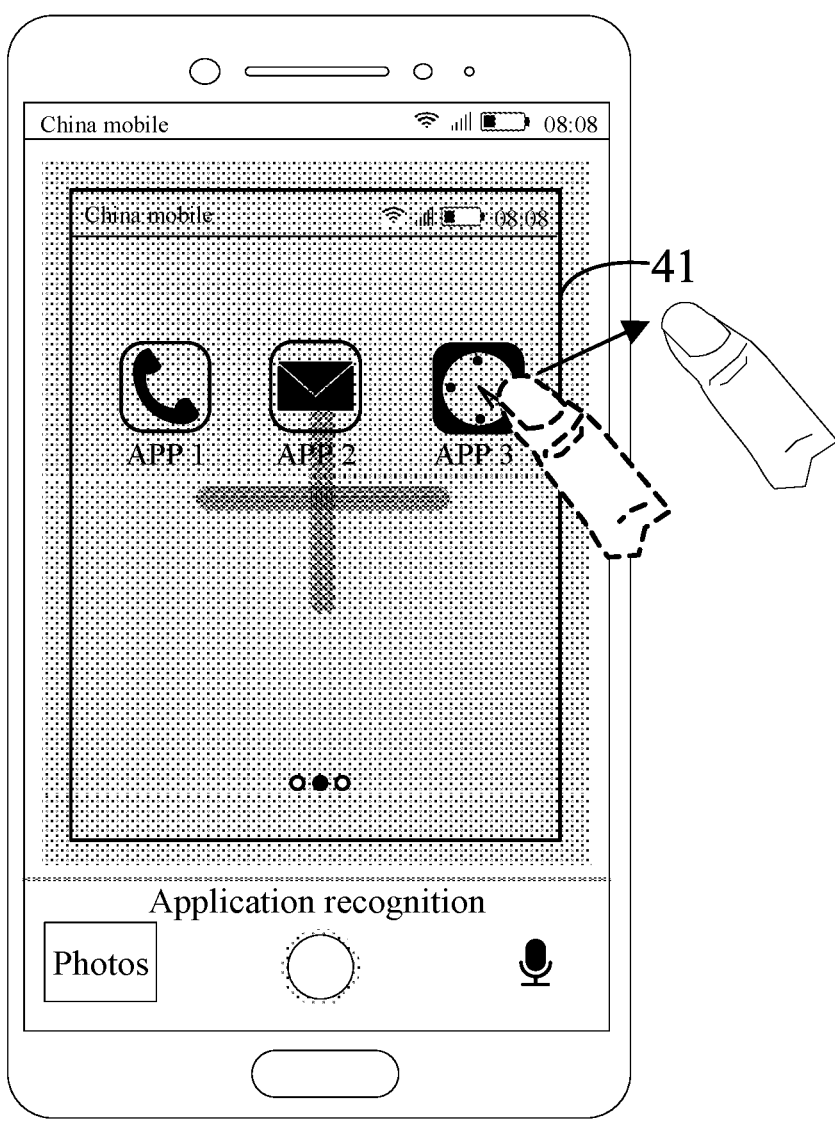
FIG. 4 is a third schematic diagram of an interface of an application management method according to an embodiment of this application.
Figure 5:
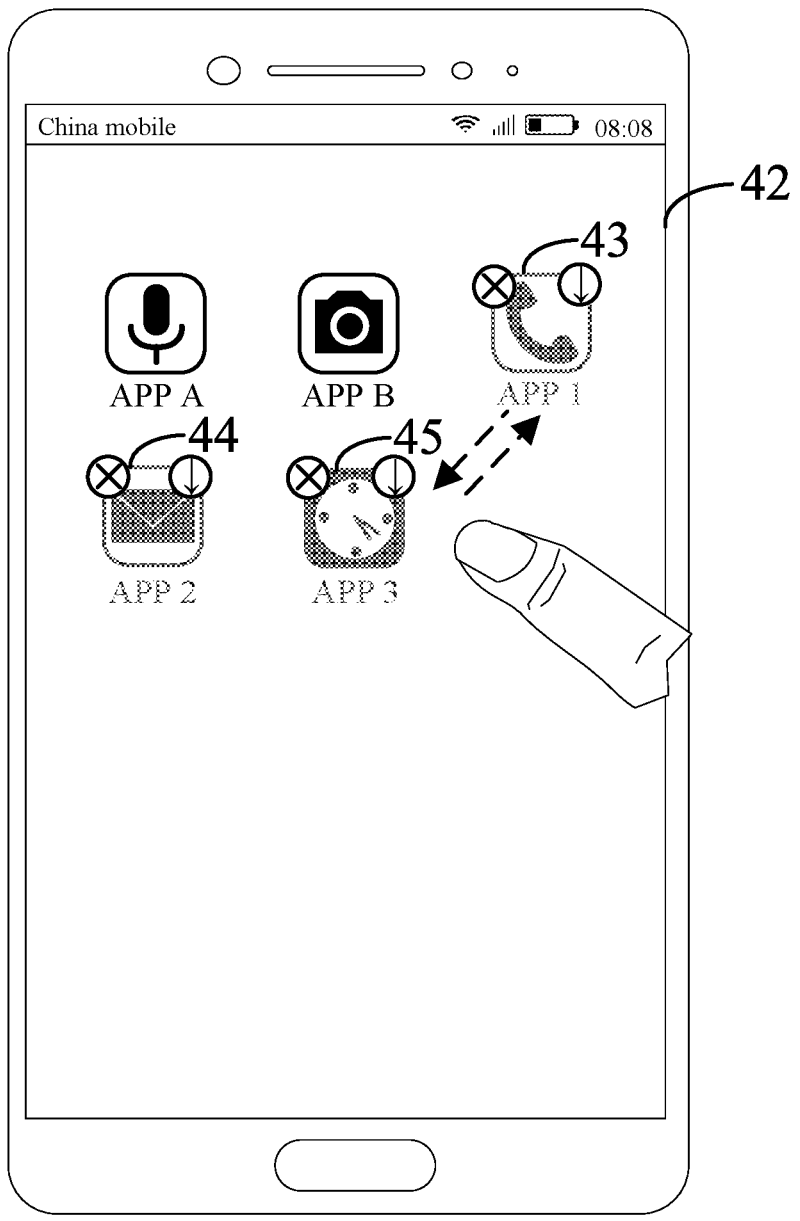
FIG. 5 is a fourth schematic diagram of an interface of an application management method according to an embodiment of this application.

Example 4, as shown in FIG. 4, a preview interface of the camera of the mobile phone is displayed on the screen of the mobile phone, and an image 41 of the desktop of the old mobile phone is displayed in the preview interface. The image 41 includes images of three non-installed applications, that is, an image of an application 1, an image of an application 2, and an image of an application 3. Then, in a case that the mobile phone recognizes the application 1, the application 2, and the application 3 in the image 31, as shown in FIG. 5, the mobile phone displays a mobile phone desktop 42. The desktop 42 displays icons of two original applications in a display manner with a transparency of 100%, namely, an icon of an application A and an icon of an application B, and also displays an icon 43 of the application 1, an icon 44 of the application 2, and an icon 45 of the application 3 in a display manner with a transparency of 50%.

It should be noted that in a case that the mobile phone recognizes the application 1, the application 2, and the application 3 in the image 31, the mobile phone may be triggered to display the mobile phone desktop 42 after the user clicks a shooting button.

It should be noted that, in order to help the user to distinguish the original application from the new application, the application management apparatus may display an icon of the original application and an icon of the new application in different regions.

In an example, the application management apparatus may display the M icons in the first display manner, and control the M icons to be in an editable state.

In some embodiments, when the M icons are in the editable state, it may be considered that the M icons are in a downloadable state, an updateable state, or a creatable state. For example, when the M icons are in an editable state, a download identifier may be displayed on the M icons (for example, "↓" is displayed in the upper right corner of the M icons).

Example 5, in a case that the mobile phone recognizes the application 1 in the image 31, as shown in FIG. 3, the mobile phone may display the icon 33 of the application 1 on the desktop 32 in a display manner with a transparency of 50%, and a download identifier "↓" is displayed in the upper right corner of the icon 33.

Example 6, in a case that the mobile phone recognizes the application 1, the application 2, and the application 3 in the image 41, as shown in FIG. 5, the mobile phone may display an icon 43 of the application 1, an icon 44 of the application 2, and an icon 45 of the application 3 on the desktop 42 in a display manner with a transparency of 50%. In addition, the download identifier "↓" is displayed in the upper right corner of the icon 43; the download identifier "↓" is displayed in the upper right corner of the icon 44; and the download identifier "↓" is displayed in the upper right corner of the icon 45.

In another example, the application management apparatus may display the M icons in the first display manner, and display the target control, where the target control may be used to trigger the application management apparatus to control the M icons to be in an editable state. After receiving a touch input from the user on the target control, the application management apparatus controls the M icons to be in an editable state.

The target control may be an existing control or a newly added control, which is not limited in this embodiment of this application.

Figure 6:
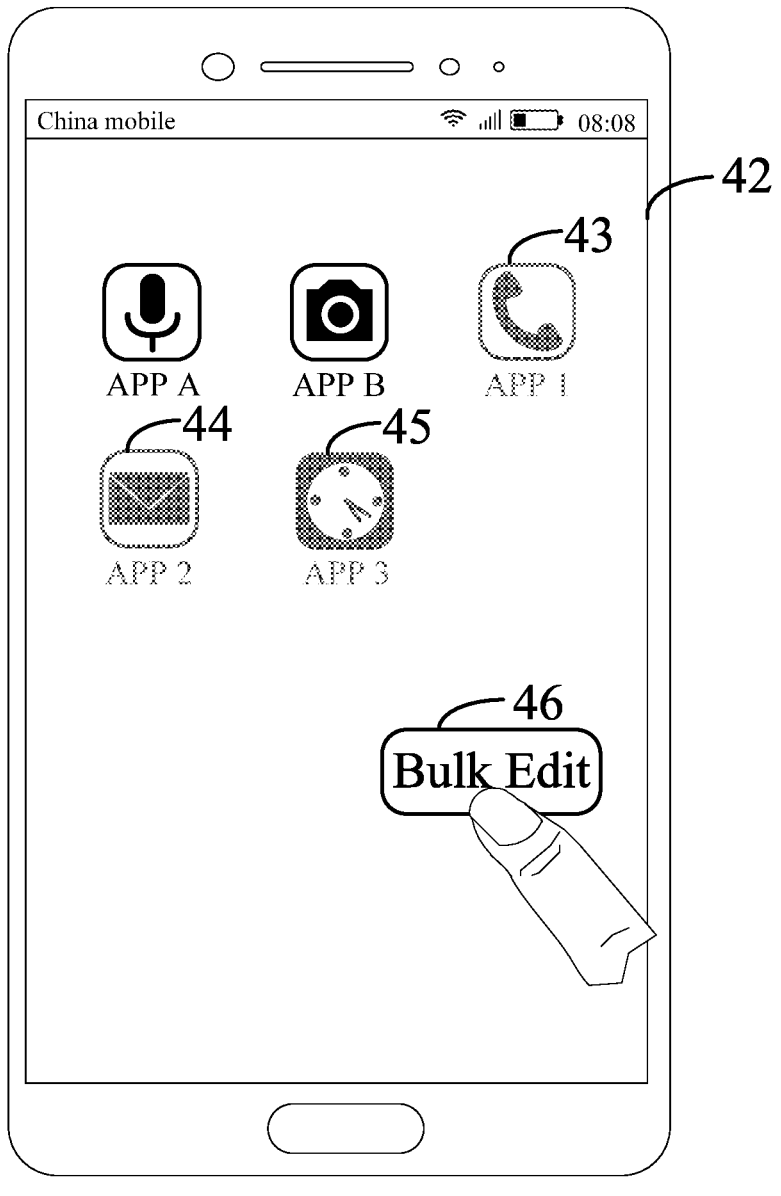
FIG. 6 is a fifth schematic diagram of an interface of an application management method according to an embodiment of this application.

For example, with reference to FIG. 4, in a case that the mobile phone recognizes the application 1, the application 2, and the application 3 in the image 41, as shown in FIG. 6, the mobile phone displays icons of two original applications on the desktop 42 in a display manner with a transparency of 100%, namely, an icon of an application A and an icon of an application B, and also displays an icon 43 of the application 1, an icon 44 of the application 2, and an icon 45 of the application 3 on the desktop 42 in a display manner with a transparency of 50%. In addition, a "Bulk Edit" control 46 is displayed. When the user wants to trigger the mobile phone to download the application 1, the application 2, and the application 3, the user may click the "Bulk Edit" control 46. In this case, as shown in FIG. 5, the mobile phone controls the icon 43, the icon 44, and the icon 45 to be in an editable state. The download identifier "↓" is displayed in the upper right corner of the icon 43; the download identifier "↓" is displayed in the upper right corner of the icon 44; and the download identifier "↓" is displayed in the upper right corner of the icon 45.

For example, a specific process in which the application management apparatus recognizes the application in the image may be as follows: the application management apparatus extracts an image of each application from the image; then the application management apparatus may initiate an application search to the server; next, the server may match a stored image of the application based on an image of each application sent by the application management apparatus, so as to accurately match the application corresponding to the image of the application in the image; and finally, the application management apparatus may obtain, from the server, and display an icon of each matched application.

It should be noted that, the application management apparatus may use the image of the application in the image as the icon of the matched application for displaying without obtaining the icon of the matched application from the server. As a result, the workload of the application management apparatus can be reduced.

Step 202: The application management apparatus receives a first input from a user to a target icon in the M icons.

In this embodiment of this application, the first input may be a click input from the user to a target icon, or a voice command entered by the user, or a specific gesture entered by the user, which can be determined according to actual use requirements and is not limited in this embodiment of this application.

The specific gesture in this embodiment of this application may be any one of a tap gesture, a sliding gesture, a drag gesture, a pressure recognition gesture, a long-press gesture, an area change gesture, a double-touch gesture, or a double-tap gesture. The tap input in this embodiment of this application may be a tap input, a double-tap input, a tap input for any number of times, or the like, or may also be a long-press input or a touch input.

In this embodiment of this application, there may be one or more target icons. This is not limited in this embodiment of this application.

In an example, when the M icons are in an editable state, a download identifier may be displayed on the M icons (for example, "↓" is displayed in the upper right corner of the M icons), and the first input may be a click input for the download identifier by the user.

Step 203: The application management apparatus performs a target operation in response to the first input.

The target operation may include at least one of the following: downloading an application corresponding to the target icon, updating the application corresponding to the target icon, or creating a new target folder corresponding to the target icon.

In this embodiment of this application, the downloading the application corresponding to the target icon in this application refers to downloading and installing the application corresponding to the target icon. In some embodiments, the downloading the application corresponding to the target icon by the application management apparatus includes obtaining an installation package of the application corresponding to the target icon. For example, the (package, PKG) installation package or the (Android package, APK) installation package.

It should be noted that, the installation package of the application corresponding to the target icon may be obtained from the server (or local memory) when the application management apparatus recognizes the N applications in the target image; or obtained from the server (or local memory) after the application management apparatus receives the first input, which is not limited in this embodiment of this application.

It can be understood that the newly created folder in this application is used to store the icon of the application, that is, to realize the function of managing the application.

For example, after downloading the application corresponding to the target icon, the application management apparatus may display the target icon in a second display manner.

The second display manner is different from the first display manner, and the second display manner may include a second transparency. For example, if the second transparency is recorded as T2, a value of T2 may be 100%.

Figure 7:
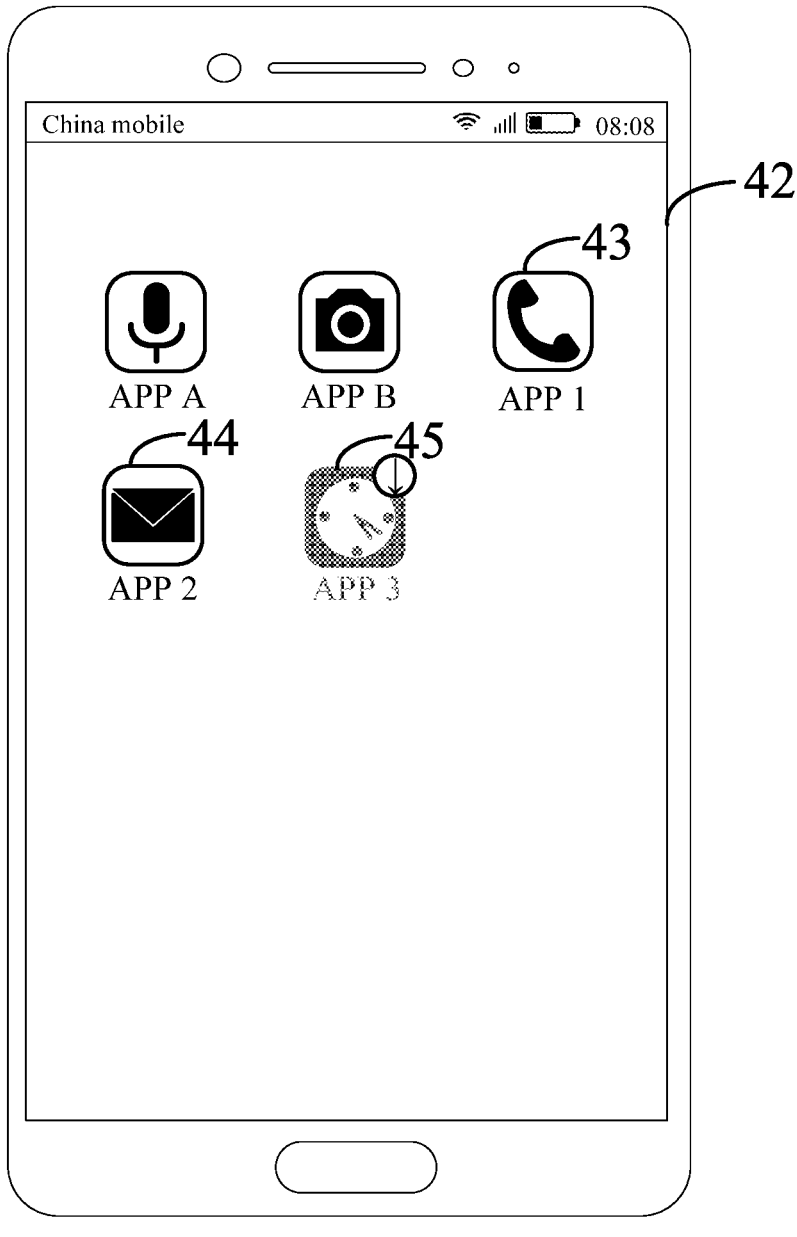
FIG. 7 is a sixth schematic diagram of an interface of an application management method according to an embodiment of this application.

For example, with reference to FIG. 5, when the user wants to trigger the mobile phone to download the application 1 and the application 2, the user may click "↓" in the upper right corner of the icon 43 and "↓" in the upper right corner of the icon 44. In this case, as shown in FIG. 7, the mobile phone displays the icon 43 and the icon 44 on the mobile phone desktop 42 in a display manner with a transparency of 100%, and continues to display the icon 45 in a display manner with a transparency of 50%.

It should be noted that a "Download All" control may be displayed on the mobile phone desktop 42. When the user wants to trigger the mobile phone to download all applications (namely, the application 1, the application 2, and the application 3), the user may click the "Download All" control, and the mobile phone will download the application 1, the application 2, and the application 3. In this way, there is no need for the user to trigger the mobile phone to download applications one by one, so that steps of downloading the applications are simplified, thereby saving the time of the user.

It should be noted that in addition to downloading an application corresponding to the target icon, updating the application corresponding to the target icon, and creating a new target folder corresponding to the target icon, the target operation may also include deleting the target icon.

It should be noted that deleting the target icon may be understood as canceling displaying the target icon.

For example, as shown in FIG. 5, the mobile phone separately displays a deletion identifier "X" in the upper left corner of the icon 43; a deletion identifier "X" in the upper left corner of the icon 44; and a deletion identifier "X" in the upper left corner of the icon 45. When the user wants to trigger the mobile phone to delete the icon 45 of the application 3, the user may click "X" in the upper left corner of the icon 45, and then the icon 45 may be deleted from the mobile phone, and the icon 43 and the icon 44 are continued to be displayed on the mobile phone desktop 42 in a display manner with a transparency of 5%.

It should be noted that, if the user does not choose to download the application 1 and the application 2, the icon 43 and the icon 44 may be automatically deleted from the mobile phone after the mobile phone displaying the icon 43 and the icon 44 in the first display manner for a preset duration.

It should be noted that, when there are at least two target operations, it indicates that the user enters at least two target icons, that is, one target icon may be corresponding to one target operation.

For example, with reference to FIG. 5, when the user wants to trigger the mobile phone to download the application 1 and delete the icon 45 of the application 3, the user clicks "↓" in the upper right corner of the icon 43, then the application 1 is downloaded in the mobile phone; and the user clicks "X" in the upper left corner of the icon 45, then the icon 45 is deleted from the mobile phone.

According to the application management method provided in the embodiments of this application, the application management apparatus may display the M icons in a first display manner in a case of recognizing that a target image satisfies a preset condition. Each icon displayed in the first display manner indicates any one of the following: a non-installed application, an application to be updated, or an uncreated folder. Then, after receiving the first input from the user to the target icon in the M icons, the application management apparatus may perform the target operation. The target operation includes at least one of the following: downloading an application corresponding to the target icon, updating the application corresponding to the target icon, or creating a new target folder corresponding to the target icon. According to the foregoing solution, when the user wants to trigger the application management apparatus to install the application, update the application, or create a folder, the application management apparatus may be triggered to directly recognize the application or the folder corresponding to the target image. After recognizing that the target image satisfies the preset condition, the application management apparatus may display the M icons in the first display manner, so as to visually present the non-installed application, the application to be updated, or the uncreated folder to the user. Therefore, the user may trigger the application management apparatus to perform the target operation through the input to the M icons. Take installing an application as an example, compared with the solution in the related art that the user needs to firstly start a specific application, then search for a desired application, and finally download and install the application, in this application, there is no need to start the specific application, only after the application management apparatus displays M icons, the application management apparatus may be triggered to quickly download and install the application corresponding to the target icon through the first input from the user to the target icon. Similarly, after the application management apparatus displays the M icons, through the first input from the user to the target icon, the application management apparatus may be triggered to quickly update the application corresponding to the target icon, or quickly create a new target folder corresponding to the target icon. Thus, the application can be quickly managed, so that the application can be managed with simple steps and high efficiency.

In this embodiment of this application, in the process that the application management apparatus recognizes the target image, the application management apparatus may recognize the application or the folder corresponding to the target image.

In a possible manner, in a case that the recognizing that a target image satisfies a preset condition includes: recognizing that the target image includes identifiers of N non-installed applications, the displaying M icons in a first display manner in step 201 may include the following step 201*a* and step 201*b*.

Step 201*a*: The application management apparatus receives a second input from a user.

The second input is an input from the user in a first region of the target image.

For example, the second input may be a click input from the user on the first region, or a voice command entered by the user, or a specific gesture entered by the user, which can be determined according to actual use requirements and is not limited in this embodiment of this application.

In an example, the second input may be an input in which the finger of the user slides out of the screen from the first region.

For example, the target image may include at least one region, and the at least one region includes the first region. Each of the at least one region is corresponding to one or more applications.

Step 201*b*: The application management apparatus displays K icons in the first display manner in response to the second input.

The M icons include K icons, and applications corresponding to the K icons include: one or more of the N non-installed applications other than applications in the first region, where K is a positive integer, and K is less than or equal to M.

For example, after the application management apparatus receives the second input from the user, the application management apparatus may cancel recognizing the application in the first region. It can be understood that after the application management apparatus cancels recognizing the application in the first region, the application management apparatus will not display the icon of the application in the first region.

Figure 8:
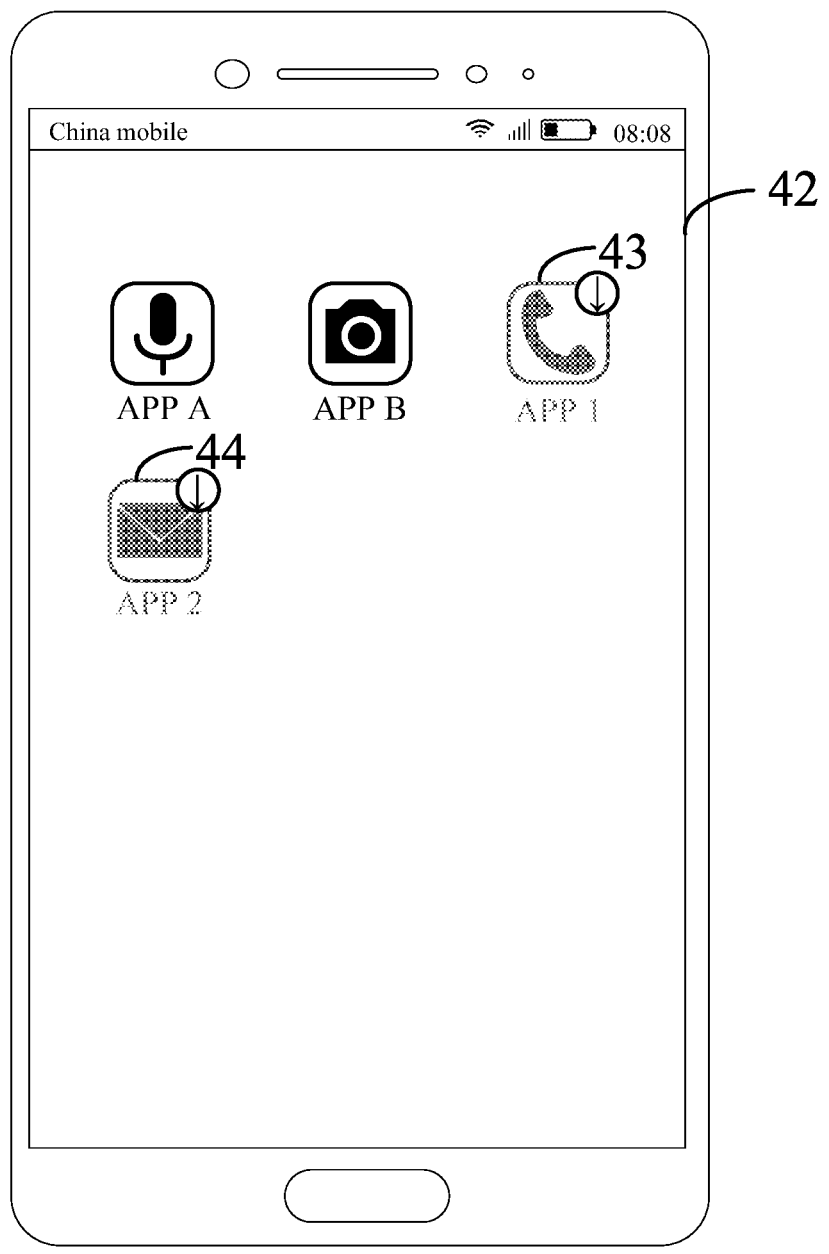
FIG. 8 is a seventh schematic diagram of an interface of an application management method according to an embodiment of this application.

For example, with reference to FIG. 4, in a case that the mobile phone recognizes the application 1, the application 2, and the application 3 in the image 41, when the user wants to trigger the mobile phone to cancel recognizing the application 3, the user may slide the finger out of the screen of the mobile phone from a region where the image of the application 3 in the image 41 is located (namely, the second input described above). Then, as shown in FIG. 8, the mobile phone cancels recognizing the application 3. The desktop 42 displays icons of two original applications in a display manner with a display transparency of 100%, namely, an icon of an application A and an icon of an application B, and the desktop 42 also displays an icon 43 of the application 1 and an icon 44 of the application 2 (namely, the K icons) in a display manner with a transparency of 50%. In addition, the download identifier "↓" is displayed in the upper right corner of the icon 43, and the download identifier "↓" is displayed in the upper right corner of the icon 44.

In another possible manner, in a case that the recognizing that a target image satisfies a preset condition includes: recognizing that the target image includes identifiers of N non-installed applications, before the displaying M icons in a first display manner in step 201, the method may further include the following step A1 and step A2.

Step A1: The application management apparatus receives a third input from a user.

The third input is an input from the user in a second region of the target image.

For example, the third input may be a click input from the user on the second region, or a voice command entered by the user, or a specific gesture entered by the user, which can be determined according to actual use requirements and is not limited in this embodiment of this application.

In an example, the third input may be a long-press input from the user on the second region.

Step A2: The application management apparatus downloads, in response to the third input, W applications corresponding to identifiers displayed in the second region.

It can be understood that the application management apparatus downloads W applications refers to that the application management apparatus downloads and installs the W applications. In some embodiments, that the application management apparatus downloads W applications includes obtaining installation packages of the W applications.

It should be noted that, the installation packages of the W applications may be obtained from the server when the application management apparatus recognizes the N applications in the target image; or obtained from the server after the application management apparatus receives the third input, which is not limited in this embodiment of this application.

Based on step A1 and step A2, the displaying M icons in a first display manner in step 201 may include the following step 201*c*.

Step 201*c*: The application management apparatus displays M icons in the first display manner, and displays W icons corresponding to the W applications in a second display manner.

Applications corresponding to the M icons include: one or more of the N non-installed applications other than the W applications, and each icon displayed in the second display manner indicates an installed application.

For example, the second display manner is different from the first display manner, and the second display manner may include a second transparency. For example, if the second transparency is recorded as T2, a value of T2 may be 100%.

For example, with reference to FIG. 4, in a case that the mobile phone recognizes the application 1, the application 2, and the application 3 in the image 41, when the user wants to trigger the mobile phone to download the application 1 and the application 2, the user may long press a region where an image of the application 1 is located and a region where an image of the application 2 is located in the image 41. Then, as shown in FIG. 7, the mobile phone may display the icon 43 of the application 1 and the icon 44 of the application 2 on the desktop 42 in a display manner with a transparency of 100%, displays the icon 45 of the application 3 in a display manner with a transparency of 50%, and separately displays a download identifier "↓" on the upper right corner of the icon 45.

The application management method provided in the embodiments of this application may be applied to a scenario in which an application corresponding to an image is operated in an image recognizing process. The application management apparatus may download or cancel recognizing the application corresponding to the target icon in the process of recognizing the target image, so as to prevent the application management apparatus from displaying unnecessary icons. This not only improves the flexibility of application management, but also reduces the workload of the application management apparatus.

In this embodiment of this application, the application management apparatus may display the M icons and icons on which the target operation is performed on different interfaces.

In an example, in a case that the target icon indicates a non-installed application, the displaying M icons in a first display manner in step 201 may include the following step 201*d*.

Step 201*d*: The application management apparatus displays the M icons in the first display manner on the display interface for the target image.

For example, the display interface for the target image may be a shooting preview interface of a camera, or an image display interface (such as an interface of a "Photos" application, or an interface of a "Chat" application). This is not limited in this embodiment of this application.

Based on step 201*b*, the downloading an application corresponding to the target icon in step 203 described above may include the following step 203*a*.

Step 203*a*: The application management apparatus downloads a target application corresponding to the target icon, and displays an icon of the target application on a desktop.

For example, display positions of the M icons in the display interface for the target image may be corresponding to display positions of the M icons on the desktop. For example, a display position of an icon in the display interface for the target image is in a one-to-one correspondence with a display position of the icon on the desktop.

For example, with reference to FIG. 4, in a case that the mobile phone recognizes the application 1, the application 2, and the application 3 in the image 31, the mobile phone may display an icon of the application 1, an icon of the application 2, and an icon of the application 3 on a preview interface with a transparency of 50%. When the user wants to download the application 1, the user may long press the icon of the application 1. Then, the mobile phone displays a mobile phone desktop. The desktop displays icons of two original applications in a display manner with a transparency of 100%, namely, an icon of an application A and an icon of an application B, and also displays an icon of the application 1 in a display manner with a transparency of 100%.

The application management method provided in the embodiments of this application may be applied to scenarios where icons on which the target operation is (not) performed are displayed in different interfaces. The application management apparatus may display the M icons in the display interface for the target image during the process of recognizing the target image. Then, the user may enter in the display interface for the target image according to requirements, so as to trigger the application management apparatus to download the target application corresponding to the target icon in the M icons. Finally, only the icon of the application that the user wants to download is displayed on the desktop. This prevents the application management apparatus from displaying unnecessary icons on the desktop, and not only the flexibility of application management is improved, but the desktop looks tidier.

In this embodiment of this application, after displaying the M icons, the application management apparatus may adjust the display positions of the M icons according to requirements.

In an example, in a case that each icon displayed in the first display manner indicates a non-installed application, after the displaying M icons in a first display manner in step 201, the method may further include the following step 204 and step 205.

Step 204: The application management apparatus receives a fourth input from a user to a first icon in the M icons.

For example, the fourth input may be a click input from the user to the first icon, or a voice command entered by the user, or a specific gesture entered by the user, which can be determined according to actual use requirements and is not limited in this embodiment of this application.

Step 205: The application management apparatus adjusts a display position of the first icon in response to the fourth input.

For example, there may be one or more first icons, which is not limited in this embodiment of this application.

Figure 9:
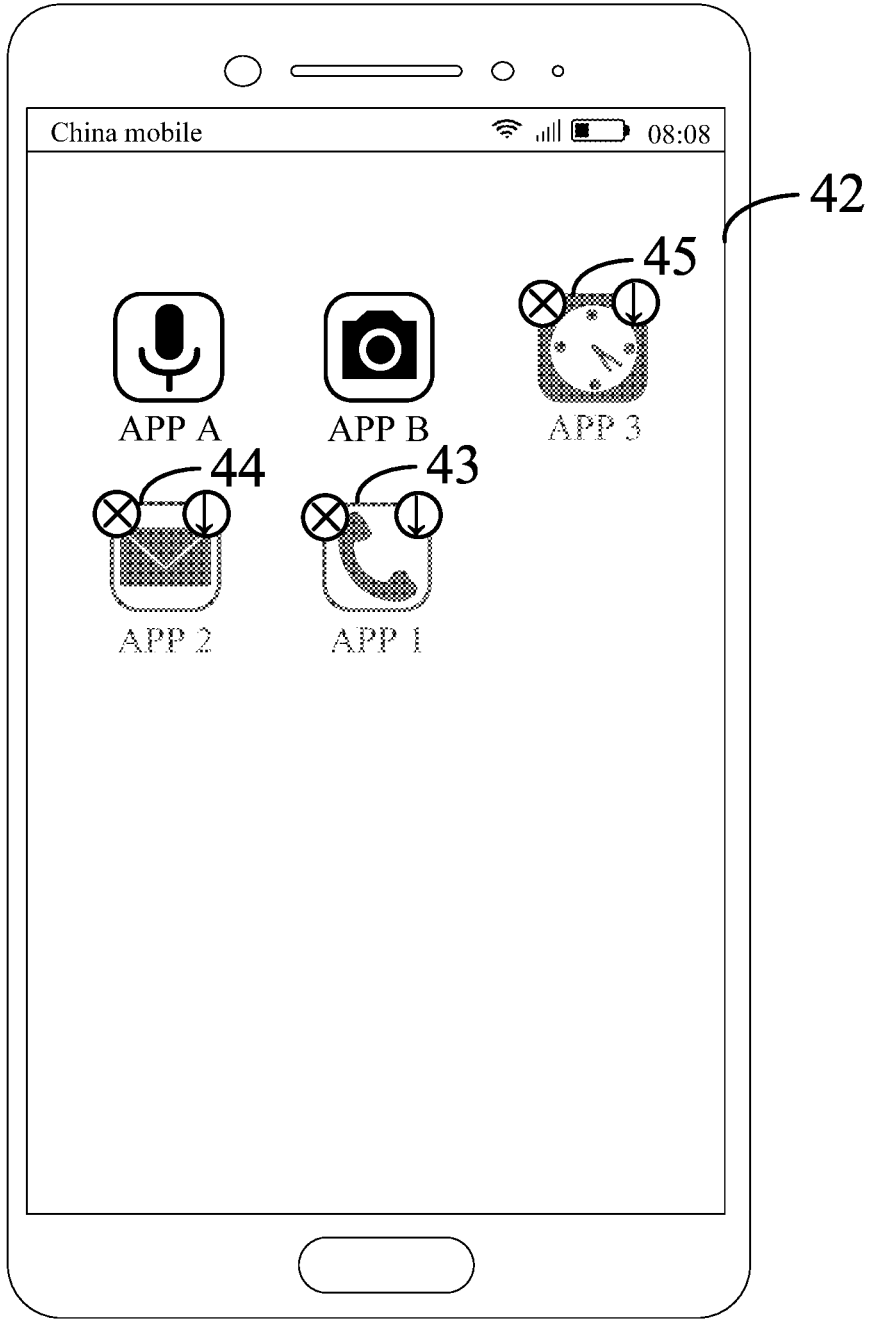
FIG. 9 is an eighth schematic diagram of an interface of an application management method according to an embodiment of this application.

For example, with reference to FIG. 5, if the user wants to exchange the position of the icon 43 of the application 1 with the position of the icon 45 of the application 3, the user may long press and drag the icon 43 of the application 1 to the position of the icon 45 of the application 3. In this case, as shown in FIG. 9, the mobile phone displays the icon 45 of the application 3 at the position where the icon 43 of the application 1 is located before, and displays the icon 43 of the application 1 at the position where the icon 45 of the application 3 is located before. The display position of the icon 44 of the application 2 is kept unchanged.

Based on step 204 and step 205, step 203 described above may include the following step 203*b*.

Step 203*b*: The application management apparatus downloads, in response to the first input, an application corresponding to the target icon, and displays the M icons based on an adjusted display position.

For example, the target icon may be the same as or different from the first icon, which is not limited in this embodiment of this application.

It should be noted that, when there are a plurality of target icons and a plurality of first icons, some of the target icons may be the same as some of the first icons.

In another example, after step 201*d*, the method may further include the following step B1 and step B2.

Step B1: The application management apparatus receives a fifth input from a user in a third region of the target image.

An image of the third region includes an identifier of an application.

For example, the fifth input may be a click input from the user to the third region, or a voice command entered by the user, or a specific gesture entered by the user, which can be determined according to actual use requirements and is not limited in this embodiment of this application.

Step B2: The application management apparatus adjusts a display position of the image of the third region in response to the fifth input.

For example, with reference to FIG. 4, in a case that the mobile phone recognizes the application 1, the application 2, and the application 3 in the image 31, if the user wants to exchange, in the image 31, the image of the region where the icon of the application 1 is located with the image of the region where the icon of the application 3 is located, the user may long press and drag the image of the region where the icon of the application 1 is located to the region where the icon of the application 3 is located. In this case, the mobile phone displays the image of the region where the icon of the application 3 is located in an image region where the icon of the application 1 is located before, and displays the image of the region where the icon of the application 1 is located in the region where the icon of the application 3 is located before.

It should be noted that the mobile phone may segment the image 31 to obtain the image of the region where the icon of the application 1 is located and the image of the region where the icon of the application 3 is located.

The application management method provided in the embodiments of this application may be applied to a scenario of adjusting the display position of the icon. The user may adjust the display position of the first icon before downloading the application corresponding to the target icon according to requirements. Therefore, while the application management apparatus downloads the application corresponding to the target icon, the M icons may be directly displayed based on the adjusted display position, which improves the flexibility of the application management.

In this embodiment of this application, the user may trigger the application management apparatus to recognize the target image.

For example, before step 201, the method may further include the following step C1 and step C2.

Step C1: The application management apparatus receives a sixth input from a user to a preset identifier.

For example, the sixth input may be a click input from the user to a preset identifier, or a voice command entered by the user, or a specific gesture entered by the user, which can be determined according to actual use requirements and is not limited in this embodiment of this application.

Step C2: The application management apparatus enables an application recognition function in response to the sixth input.

For example, the enabling the application recognition function includes: turning on a camera of the application management apparatus.

It can be understood that the application recognition function refers to the function of recognizing an application corresponding to an image when the application management apparatus recognizes the image.

Figure 10:
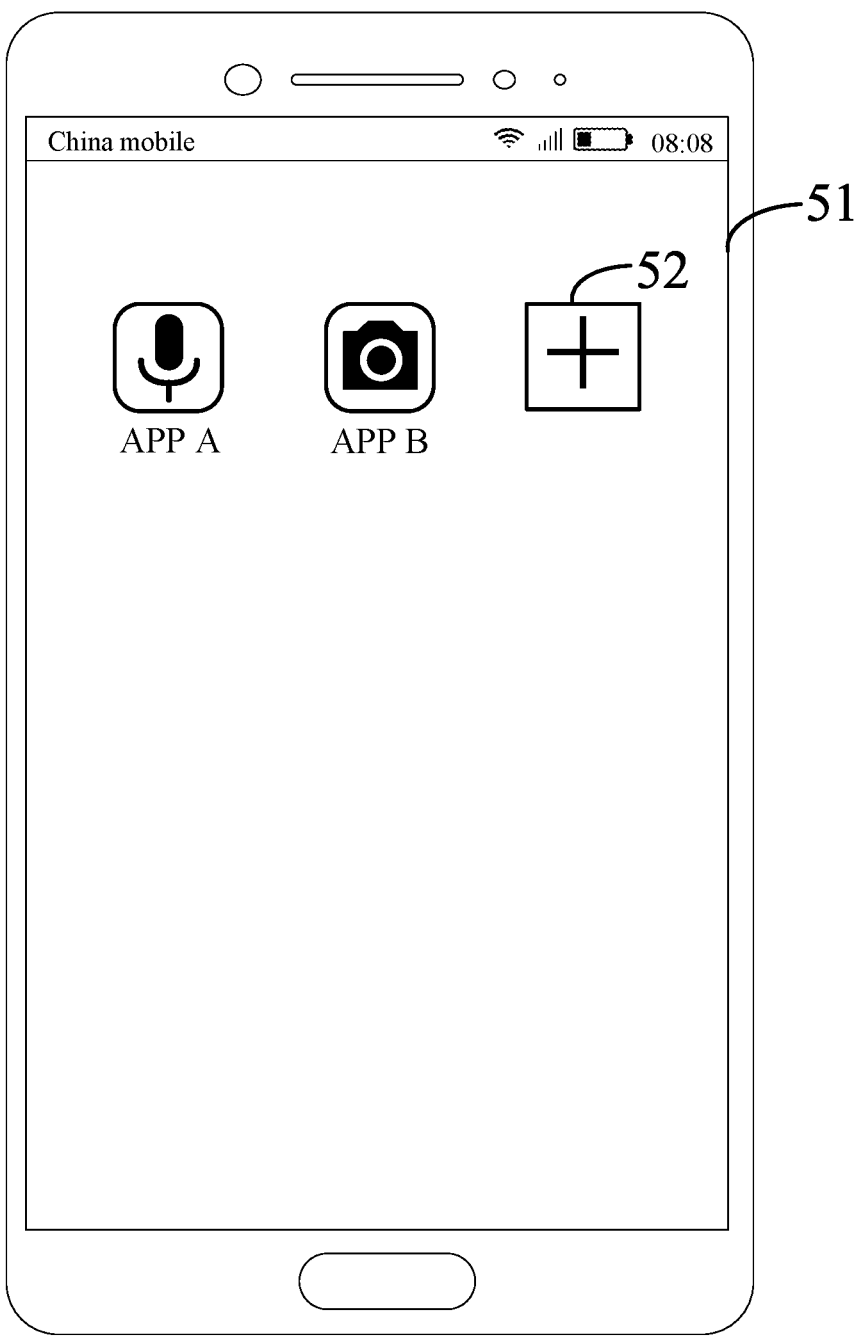
FIG. 10 is a ninth schematic diagram of an interface of an application management method according to an embodiment of this application.

For example, when the user wants to trigger the mobile phone to enable the application recognition function, the user may first click the "Settings" application to enter the setting interface, and then click the "Virtual Icon Application Distribution" option displayed in the setting interface. Then, the user may click the "Enable" button in the "Virtual Icon Application Distribution" option. In this case, as shown in FIG. 10, the mobile phone enables the application recognition function, the mobile phone displays the mobile phone desktop 51, and the mobile phone desktop 51 displays two icons of the original applications, which are respectively the icon of the application A and the icon of the application B, and a virtual icon "+" (namely, the preset identifier, such as 52 in FIG. 10). Finally, the user may click the virtual icon 52 "+" to recognize the desired image by using the mobile phone, that is, triggering the mobile phone to enable the application recognition function.

It should be noted that the virtual icon 52 "+" may be set in a shooting interface of the "Camera" application, and may also be set in any interface that may trigger the enabling of the application recognition function. This is not limited in this embodiment of this application.

The application management method provided in the embodiments of this application may be applied to a scenario in which the application recognition function is triggered by mistake. The user may trigger the application management apparatus to enable the application recognition function through the fifth input of the preset identifier. Thus, it is avoided that the application recognition function is triggered by mistake on the application management apparatus.

It should be noted that, the application management method provided in the embodiments of this application may be performed by an application management apparatus, or a control module, in the application management apparatus, configured to perform the application management method. In the embodiments of this application, an example in which the application management apparatus performs the application management method is used to describe the application management apparatus provided in the embodiments of this application.

Figure 11:
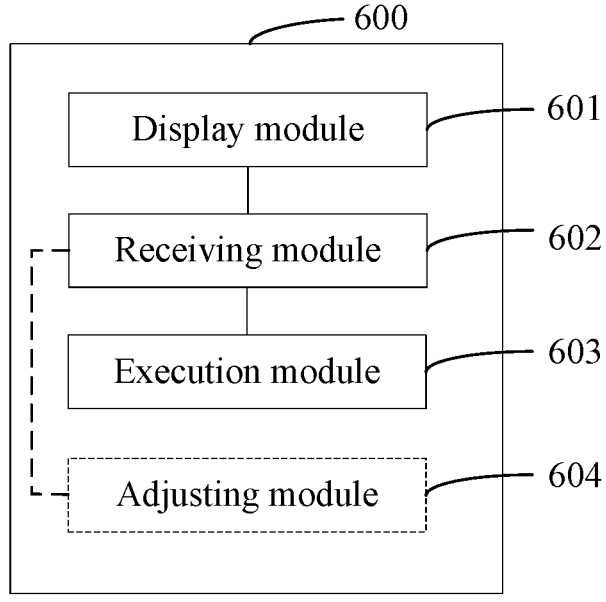
FIG. 11 is a schematic structural diagram of an application management apparatus according to an embodiment of this application.

FIG. 11 is a possible schematic structural diagram of an application management apparatus according to an embodiment of this application. As shown in FIG. 11, the application management apparatus 600 includes: a display module

601, a receiving module 602, and an execution module 603, where the display module 601 is configured to: in a case of recognizing that a target image satisfies a preset condition, display M icons in a first display manner, where M is a positive integer; the receiving module 602 is configured to receive a first input from a user to a target icon in the M icons displayed by the display module 601; and the execution module 603 is configured to perform a target operation in response to the first input received by the receiving module 602, where each icon displayed in the first display manner indicates any one of the following: a non-installed application, an application to be updated, or an uncreated folder; and the target operation includes at least one of the following: downloading an application corresponding to the target icon, updating the application corresponding to the target icon, and creating a new target folder corresponding to the target icon.

In some embodiments, the recognizing that a target image satisfies a preset condition includes at least one of the following: recognizing that the target image includes identifiers of N applications, and the N applications are non-installed applications or applications to be updated in an electronic device; or recognizing that the target image includes identifiers of X folders, and the X folders are uncreated folders in the electronic device, where both N and X are positive integers.

In some embodiments, the recognizing that a target image satisfies a preset condition includes: recognizing that the target image includes identifiers of N non-installed applications; the receiving module 602 is further configured to receive a second input from a user, where the second input is an input from the user in a first region of the target image; and the display module 601 is configured to display K icons in the first display manner in response to the second input received by the receiving module 602, where K is a positive integer, and K is less than or equal to M, where applications corresponding to the K icons include: one or more of the N non-installed applications other than applications in the first region.

In some embodiments, the recognizing that a target image satisfies a preset condition includes: recognizing that the target image includes identifiers of N non-installed applications; the receiving module 602 is further configured to receive a third input from a user, where the third input is an input from the user in a second region of the target image; the execution module 603 is further configured to download, in response to the third input received by the receiving module 602, W applications corresponding to identifiers displayed in the second region; and the display module 601 is configured to display M icons in the first display manner, and display W icons corresponding to the W applications downloaded by the execution module 603 in a second display manner, where applications corresponding to the M icons include: one or more of the N non-installed applications other than the W applications, and each icon displayed in the second display manner indicates an installed application.

In some embodiments, as shown in FIG. 11, the application management apparatus 600 further includes: an adjusting module 604; each icon displayed in the first display manner indicates a non-installed application; the receiving module 602 is further configured to receive a fourth input from a user to a first icon in the M icons; the adjusting module 604 is configured to adjust a display position of the first icon in response to the fourth input received by the receiving module 602; the execution module 603 is configured to download, in response to the first input received by the receiving module 602, an application corresponding to the target icon; and the display module 601 is further configured to display the M icons based on an adjusted display position.

In some embodiments, the target icon indicates a non-installed application; the display module 601 is configured to display the M icons on a display interface for the target image in the first display manner; and the execution module 603 is configured to download a target application corresponding to the target icon, and display an icon of the target application on a desktop.

In some embodiments, the application management apparatus further includes: an adjusting module 604; the receiving module 602 is further configured to receive a fifth input from a user in a third region of the target image, where an image of the third region includes an identifier of an application; and the adjusting module 604 is configured to adjust a display position of the image of the third region in response to the fifth input received by the receiving module 602.

It should be noted that, as shown in FIG. 11, modules that must be included in the application management apparatus 600 are illustrated by solid line frames, such as the display module; and modules that may or may not be included in the application management apparatus 600 is illustrated by dashed line frames, such as the adjusting module 604.

According to the application management apparatus provided in the embodiments of this application, the application management apparatus may display the M icons in a first display manner in a case of recognizing that a target image satisfies a preset condition, where each icon displayed in the first display manner indicates any one of the following: a non-installed application, an application to be updated, or an uncreated folder. Then, after receiving the first input from the user to the target icon in the M icons, the application management apparatus may perform the target operation. The target operation includes at least one of the following: downloading an application corresponding to the target icon, updating the application corresponding to the target icon, or creating a new target folder corresponding to the target icon. According to the foregoing solution, when the user wants to trigger the application management apparatus to install the application, update the application, or create a folder, the application management apparatus may be triggered to directly recognize the application or the folder corresponding to the target image. After recognizing that the target image satisfies the preset condition, the application management apparatus may display the M icons in the first display manner, so as to visually present the non-installed application, the application to be updated, or the uncreated folder to the user. Therefore, the user may trigger the application management apparatus to perform the target operation through the input to the M icons. Take installing an application as an example, compared with the solution in the related art that the user needs to firstly start a specific application, then search for a desired application, and finally download and install the application, in this application, there is no need to start the specific application, only after the application management apparatus displays M icons, the application management apparatus may be triggered to quickly download and install the application corresponding to the target icon through the first input from the user to the target icon. Similarly, after the application management apparatus displays the M icons, through the first input from the user to the target icon, the application management apparatus may be triggered to quickly update the application corresponding to the target icon, or quickly create a new target folder corresponding to the target icon. Thus, the application can be quickly managed, so that the application can be managed with simple steps and high efficiency.

The application management apparatus in the embodiments of this application may be an apparatus, or a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a Network Attached Storage (NAS), a personal computer (PC), a television (TV), a teller machine, a self-service machine, or the like. This is not specifically limited in the embodiments of this application.

The application management apparatus in the embodiments of this application may be an apparatus with an operating system. The operating system may be an Android operating system, may be an iOS operating system, or may be another possible operating system, which is not specifically limited in the embodiments of this application.

The application management apparatus provided in the embodiments of this application can implement the processes implemented in the method embodiments of FIG. 1 to FIG. 9. To avoid repetition, details are not described herein again.

Figure 12:
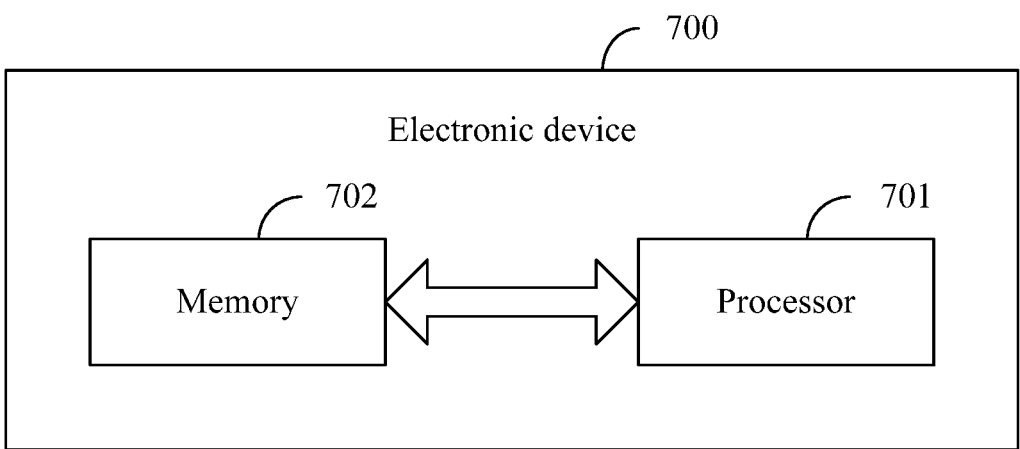
FIG. 12 is a first schematic structural diagram of an electronic device according to an embodiment of this application.

As shown in FIG. 12, an embodiment of this application further provides an electronic device 700, including a processor 701, a memory 702, and a program or an instruction stored in the memory 702 and executable on the processor 701. When the program or the instruction is executed by the processor 701, the processes of the foregoing application management method embodiment are implemented and a same technical effect can be achieved. To avoid repetition, details are not described herein again.

It should be noted that the electronic device in this embodiment of this application includes the mobile electronic device and the non-mobile electronic device described above.

Figure 13:
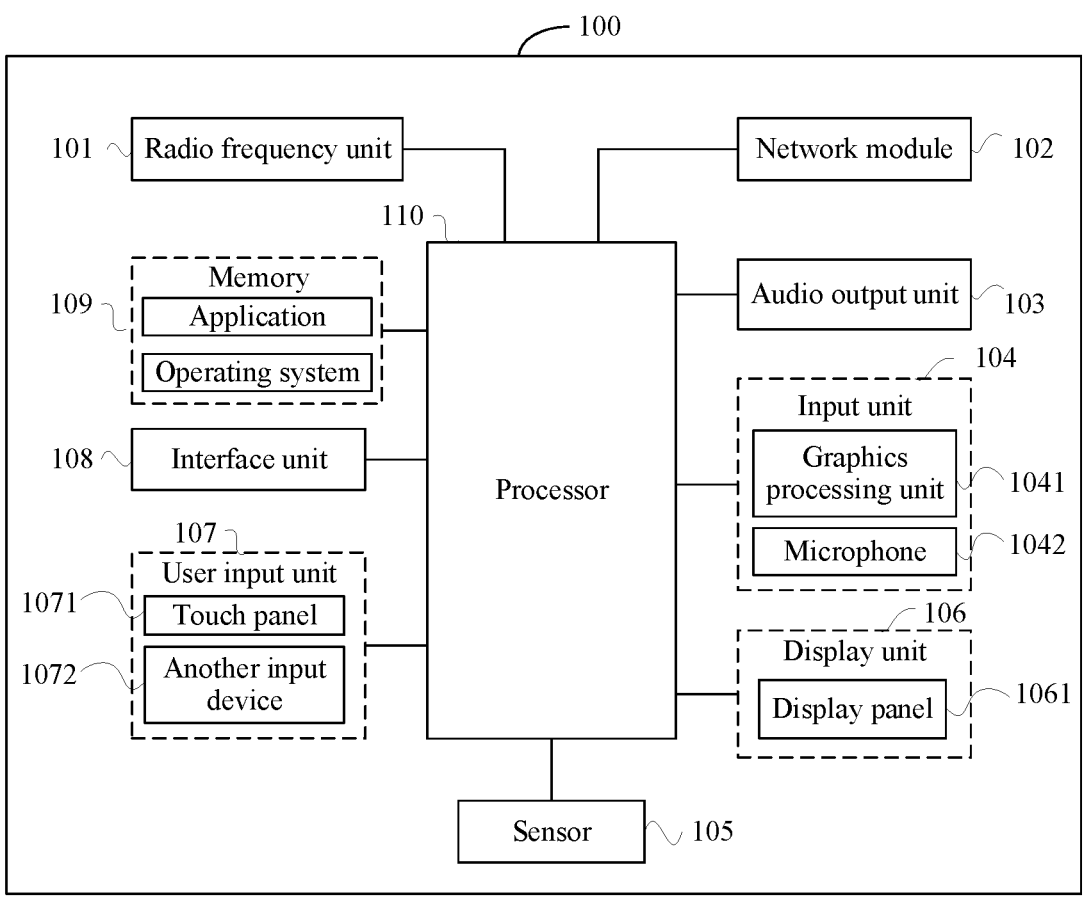
FIG. 13 is a second schematic structural diagram of an electronic device according to an embodiment of this application.

FIG. 13 is a schematic structural diagram of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (for example, a battery) that supplies power to the components. The power supply may be logically connected to the processor 110 by using a power management system, so as to implement functions such as charging management, discharging management, and power consumption management by using the power management system. The electronic device is not limited to the electronic device structure shown in FIG. 13. The electronic device may include more or fewer components than those shown in the figure, or combine some of the components, or arrange the components differently. Details are not described herein.

The display unit 106 is configured to: in a case of recognizing that a target image satisfies a preset condition, display M icons in a first display manner, where M is a positive integer; the user input unit 107 is configured to receive a first input from a user to a target icon in the M icons displayed by the display unit 106; and the processor 110 is configured to perform a target operation in response to the first input received by the user input unit 107, where each icon displayed in the first display manner indicates any one of the following: a non-installed application, an application to be updated, or an uncreated folder; and the target operation includes at least one of the following: downloading an application corresponding to the target icon, updating the application corresponding to the target icon, or creating a new target folder corresponding to the target icon.

In some embodiments, the recognizing that a target image satisfies a preset condition includes at least one of the following: recognizing that the target image includes identifiers of N applications, and the N applications are non-installed applications or applications to be updated in an electronic device; or recognizing that the target image includes identifiers of X folders, and the X folders are uncreated folders in the electronic device, where both N and X are positive integers.

In some embodiments, the recognizing that a target image satisfies a preset condition includes: recognizing that the target image includes identifiers of N non-installed applications; the user input unit 107 is further configured to receive a second input from a user, where the second input is an input from the user in a first region of the target image; and the display unit 106 is configured to display K icons in the first display manner in response to the second input received by the user input unit 107, where K is a positive integer, and K is less than or equal to M, where applications corresponding to the K icons include: one or more of the N non-installed applications other than applications in the first region.

In some embodiments, the recognizing that a target image satisfies a preset condition includes: recognizing that the target image includes identifiers of N non-installed applications; the user input unit 107 is further configured to receive a third input from a user, where the third input is an input from the user in a second region of the target image; the processor 110 is further configured to download, in response to the third input received by the user input unit 107, W applications corresponding to identifiers displayed in the second region; and the display unit 106 is configured to display M icons in the first display manner, and display W icons corresponding to the W applications downloaded by the processor 110 in a second display manner, where applications corresponding to the M icons include: one or more of the N non-installed applications other than the W applications, and each icon displayed in the second display manner indicates an installed application.

In some embodiments, each icon displayed in the first display manner indicates a non-installed application; the user input unit 107 is further configured to receive a fourth input from a user to a first icon in the M icons; the processor 110 is configured to adjust a display position of the first icon in response to the fourth input received by the user input unit 107; and is configured to download, in response to the first input received by the user input unit 107, an application corresponding to the target icon; and the display unit 106 is further configured to display the M icons based on an adjusted display position.

In some embodiments, the target icon indicates a non-installed application; the display unit 106 is configured to display the M icons on a display interface for the target image in the first display manner; and the processor 110 is configured to download a target application corresponding to the target icon, and display an icon of the target application on a desktop.

In some embodiments, the user input unit 107 is further configured to receive a fifth input from a user in a third region of the target image, where an image of the third region includes an identifier of an application; and the processor 110 is configured to adjust a display position of the image of the third region in response to the fifth input received by the user input unit 107.

According to the electronic device provided in the embodiments of this application, the electronic device may display the M icons in a first display manner in a case of recognizing that a target image satisfies a preset condition. Each icon displayed in the first display manner indicates any one of the following: a non-installed application, an application to be updated, or an uncreated folder. Then, after receiving the first input from the user to the target icon in the M icons, the electronic device may perform the target operation. The target operation includes at least one of the following: downloading an application corresponding to the target icon, updating the application corresponding to the target icon, or creating a new target folder corresponding to the target icon. According to the foregoing solution, when the user wants to trigger the application management apparatus to install the application, update the application, or create a folder, the electronic device may be triggered to directly recognize the application or the folder corresponding to the target image. After recognizing that the target image satisfies the preset condition, the electronic device may display the M icons in the first display manner, so as to visually present the non-installed application, the application to be updated, or the uncreated folder to the user. Therefore, the user may trigger the electronic device to perform the target operation through the input to the M icons. Take installing an application as an example, compared with the solution in the related art that the user needs to firstly start a specific application, then search for a desired application, and finally download and install the application, in this application, there is no need to start the specific application, only after the electronic device displays M icons, the electronic device may be triggered to quickly download and install the application corresponding to the target icon through the first input from the user to the target icon. Similarly, after the electronic device displays the M icons, through the first input from the user to the target icon, the electronic device may be triggered to quickly update the application corresponding to the target icon, or quickly create a new target folder corresponding to the target icon. Thus, the application can be quickly managed, so that the application can be managed with simple steps and high efficiency.

It should be understood that, in the embodiments of this application, the input unit 104 may include a Graphics Processing Unit (GPU) 1041 and a microphone 1042, and the graphics processing unit 1041 processes image data of a still picture or video obtained by an image capture apparatus (such as a camera) in a video capture manner or an image capture manner. The display unit 106 may include a display panel 1061, and the display panel 1061 may be configured in a form of a liquid crystal display, an organic light-emitting diode, or the like. The user input unit 107 includes a touch panel 1071 and another input device 1072. The touch panel 1071 is also referred to as a touch screen. The touch panel 1071 may include two parts: a touch detection apparatus and a touch controller. The another input device 1072 may include but is not limited to a physical keyboard, a function key (such as a volume control key or an on/off key), a trackball, a mouse, a joystick, and the like. Details are not described herein again. The memory 109 may be configured to store a software program and various data, which includes but is not limited to applications and operating systems. An application processor and a modem processor may be integrated into the processor 110. The application processor mainly processes an operating system, a user interface, an application, and the like. The modem processor mainly processes wireless communications. It can be understood that, the modem processor may not be integrated into the processor 110.

An embodiment of this application further provides a readable storage medium, where the readable storage medium stores a program or an instruction, and when the program or the instruction is executed by a processor, the processes of the foregoing application management method embodiment are implemented and a same technical effect can be achieved. To avoid repetition, details are not described herein again.

The processor is a processor in the electronic device in the foregoing embodiments. The readable storage medium includes a computer-readable storage medium such as a Read-Only Memory (ROM), a Random Access Memory (RAM), a magnetic disk, an optical disc, or the like.

An embodiment of this application still provides a chip. The chip includes a processor and a communications interface, and the communications interface is coupled to the processor. The processor is configured to run a program or an instruction to implement the processes of the foregoing application management method embodiment, and a same technical effect can be achieved. To avoid repetition, details are not described herein again.

It should be understood that the chip mentioned in the embodiments of this application may also be referred to as a system-on-chip, a system chip, a chip system, a system-on-a-chip, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims and the protection scope of claims of this application, all of which fall within the protection scope of this application.

The invention claimed is:

1. A method for application management, comprising:
recognizing that a target image satisfies a preset condition, wherein the preset condition comprises a desired action of a user to trigger a target operation on a folder indicated by the target image;
displaying at least one icon corresponding to the folder indicated by the target image, wherein one of the at least one icon is a virtual icon showing an uncreated folder and indicating the desired action of the user on the uncreated folder; and
performing the target operation in response to a first user input to the virtual icon, wherein the target operation comprises creating the uncreated folder corresponding to the virtual icon,
wherein recognizing that the target image satisfies the preset condition comprises recognizing that the target image comprises identifiers of N non-installed applications, wherein N is a positive integer; and
displaying the at least one icon comprises:
receiving a second user input, wherein the second user input is an input from the user in a first region of the target image; and
displaying K icons in a first display manner in response to the second user input, wherein K is a positive integer, and applications corresponding to the K icons comprise: one or more of the N non-installed applications other than applications in the first region.

2. The method according to claim 1, wherein recognizing that the target image satisfies the preset condition further comprises:
recognizing that the target image comprises identifiers of X folders, wherein the X folders are uncreated folders in the electronic device,
wherein X is a positive integer.

3. The method according to claim 1, wherein:
before displaying the at least one icon, the method further comprises:
receiving a third user input, wherein the third user input is an input from the user in a second region of the target image; and
downloading, in response to the third user input, W applications corresponding to identifiers displayed in the second region; and
displaying the at least one icon comprises:
displaying the at least one icon in a first display manner, and displaying W icons corresponding to the W applications in a second display manner,
wherein applications corresponding to the at least one icon comprise one or more of the N non-installed applications other than the W applications, and each icon displayed in the second display manner indicates an installed application.

4. The method of claim 1, wherein displaying at least one icon comprises:

displaying M icons in a first display manner including the virtual icon indicating the desired action of the user, wherein M is a positive integer, and each icon corresponds the folder indicated by the target image.

5. An electronic device, comprising:

a memory storing a computer program; and a processor coupled to the memory and configured to execute the computer program to perform operations comprising:

recognizing that a target image satisfies a preset condition, wherein the preset condition comprises a desired action of a user to trigger a target operation on a folder indicated by the target image;

displaying at least one icon corresponding to the folder indicated by the target image, wherein one of the at least one icon is a virtual icon showing an uncreated folder and indicating the desired action of the user on the uncreated folder; and performing the target operation in response to a first user input to the virtual icon, wherein the target operation comprises: creating the uncreated folder corresponding to the virtual icon, wherein recognizing that the target image satisfies the preset condition comprises recognizing that the target image comprises identifiers of N non-installed applications, wherein N is a positive integer; and displaying the at least one icon comprises:

receiving a second user input, wherein the second user input is an input from the user in a first region of the target image; and displaying K icons in a first display manner in response to the second user input, wherein K is a positive integer, and applications corresponding to the K icons comprise: one or more of the N non-installed applications other than applications in the first region.

6. The electronic device according to claim 5, wherein recognizing that the target image satisfies the preset condition further comprises:

recognizing that the target image comprises identifiers of X folders, wherein the X folders are uncreated folders in the electronic device, wherein X is a positive integer.

7. The electronic device according to claim 5, wherein:

before displaying the at least one icon, the operations further comprise:

receiving a third user input, wherein the third user input is an input from the user in a second region of the target image; and downloading, in response to the third user input, W applications corresponding to identifiers displayed in the second region; and displaying the at least one icon comprises:

displaying the at least one icon in a first display manner, and displaying W icons corresponding to the W applications in a second display manner, wherein applications corresponding to the at least one icon comprise one or more of the N non-installed applications other than the W applications, and each icon displayed in the second display manner indicates an installed application.

8. A non-transitory computer-readable storage medium, storing a computer program, when the computer program is executed by a processor, causes the processor to perform operations comprising:

recognizing that a target image satisfies a preset condition, wherein the preset condition comprises a desired action of a user to trigger a target operation on a folder indicated by the target image;

displaying at least one icon corresponding to the folder indicated by the target image, wherein one of the at least one icon is a virtual icon showing an uncreated folder and indicating the desired action of the user on the uncreated folder; and performing the target operation in response to a first user input to the virtual icon, wherein the target operation comprises: creating the uncreated folder corresponding to the virtual icon, wherein recognizing that the target image satisfies the preset condition comprises recognizing that the target image comprises identifiers of N non-installed applications, wherein N is a positive integer; and displaying the at least one icon comprises:

receiving a second user input, wherein the second user input is an input from the user in a first region of the target image; and displaying K icons in a first display manner in response to the second user input, wherein K is a positive integer, and applications corresponding to the K icons comprise: one or more of the N non-installed applications other than applications in the first region.

9. The non-transitory computer-readable storage medium according to claim 8, wherein recognizing that the target image satisfies the preset condition further comprises:

recognizing that the target image comprises identifiers of X folders, wherein the X folders are uncreated folders in the electronic device, wherein X is a positive integer.

10. The non-transitory computer-readable storage medium according to claim 8, wherein:

before displaying the at least one icon, the operations further comprise:

receiving a third user input, wherein the third user input is an input from the user in a second region of the target image; and downloading, in response to the third user input, W applications corresponding to identifiers displayed in the second region; and displaying the at least one icon comprises:

displaying the at least one icon in a first display manner, and displaying W icons corresponding to the W applications in a second display manner, wherein applications corresponding to the at least one icon comprise one or more of the N non-installed applications other than the W applications, and each icon displayed in the second display manner indicates an installed application.

* * * * *